US006169124B1

(12) United States Patent
Horn et al.

(10) Patent No.: US 6,169,124 B1
(45) Date of Patent: Jan. 2, 2001

(54) INNER PARTING AGENTS FOR PRODUCING SELF-PARTING MOLDINGS MADE OF POLYISOCYANATE POLYADDITION PRODUCTS

(75) Inventors: Peter Horn, Heidelberg; Dietrich Scherzer, Neustadt; Karl Häberle, Speyer; Ulrich Treuling, Bensheim; Georg Partusch, Puergen; Günter Tänny, Guntersblum; Axel Kistenmacher, Ludwigshafen, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/308,265
(22) PCT Filed: Dec. 12, 1997
(86) PCT No.: PCT/EP97/06713
  § 371 Date: May 14, 1999
  § 102(e) Date: May 14, 1999
(87) PCT Pub. No.: WO98/25985
  PCT Pub. Date: Jun. 18, 1998

(30) Foreign Application Priority Data

Dec. 13, 1996 (DE) ............................................. 196 51 994

(51) Int. Cl.$^7$ .................................................. C08G 18/04
(52) U.S. Cl. ........................... 521/155; 521/51; 521/103; 521/106; 521/120; 521/121; 521/122; 521/128; 521/130; 521/170; 521/172; 521/174; 528/44; 528/85
(58) Field of Search ............................. 521/51, 103, 106, 521/120, 121, 122, 128, 130, 155, 170, 172, 174; 528/44, 85

(56) References Cited

U.S. PATENT DOCUMENTS

| 4,003,882 | * | 1/1977 | Fagerburg et al. ................... 528/301 |
| 4,519,965 | | 5/1985 | Taylor et al. . |
| 4,581,387 | | 4/1986 | Werner et al. . |
| 4,764,537 | * | 8/1988 | Horn et al. ............................ 521/51 |
| 4,766,172 | | 8/1988 | Weber et al. . |
| 5,128,087 | | 7/1992 | Slocum et al. . |

FOREIGN PATENT DOCUMENTS

| 36 31 842 | 9/1987 | (DE) . |
| 153 639 | 4/1986 | (EP) . |
| 255 905 | 7/1987 | (EP) . |
| 0 262 378B1 | 8/1987 | (EP) . |
| 445 614 | 9/1991 | (EP) . |
| 390 48 12A1 | 2/1989 | (WO) . |
| WO 95/06673 | 9/1993 | (WO) . |

* cited by examiner

Primary Examiner—John M. Cooney, Jr.
(74) Attorney, Agent, or Firm—Fernando A. Borrego

(57) ABSTRACT

In a process for producing self-releasing, compact or cellular moldings which comprise polyisocyanate polyaddition products and may contain reinforcing material by reacting a) organic and/or modified organic polyisocyanates with b) at least one compound containing at least two reactive hydrogen atoms and having a molecular weight of from 62 to 10,000 and, if desired, c) chain extenders and/or crosslinkers in the presence of d) internal mold release agents and in the presence of or absence of e) catalysts, f) blowing agents, g) reinforcing materials and h) auxiliaries in an open or closed mold, the internal mold release agents (d) used are diesters and/or monoesters of alkylsuccinic acids and/or diesters and/or monoesters of alkenylsuccinic acids.

15 Claims, No Drawings

INNER PARTING AGENTS FOR PRODUCING SELF-PARTING MOLDINGS MADE OF POLYISOCYANATE POLYADDITION PRODUCTS

Production of self-releasing, compact or cellular moldings which comprise polyisocyanate polyaddition products and may contain reinforcing material, and internal mold release agents for this purpose.

The present invention relates to a process for producing self-releasing, compact or cellular moldings which comprise polyisocyanate polyaddition products and may contain reinforcing material by reacting a) organic or modified organic polyisocyanates with
b) compounds containing at least two reactive hydrogen atoms and having a molecular weight of from 62 to 10,000 and, if desired,
c) chain extenders and/or crosslinkers in the presence of
d) internal mold release agents and in the presence or absence of
e) catalysts,
f) blowing agents,
g) reinforcing materials and
h) auxiliaries in an open or closed mold, wherein the internal mold release agents (d) used are diesters and/or monoesters of alkylsuccinic acids and/or diesters and/or monoesters of alkenylsuccinic acids, and the use of the alkylsuccinic and/or alkenylsuccinic diesters or monoesters as internal mold release agents for moldings comprising polyisocyanate polyaddition products.

The production of moldings comprising compact or cellular polyisocyanate polyaddition products which may contain reinforcing material, for example compact or cellular elastomers containing urethane and/or urea groups, known as polyurethane (PU) elastomers, and flexible, semirigid or rigid foams containing urethane and urea groups and possibly isocyanurate groups, known as PU or polyisocyanurate (PIR) foams, by reacting organic and/or modified organic polyisocyanates with relatively high molecular weight compounds containing at least two reactive hydrogen atoms, eg. polyoxyalkylenepolyamines and/or preferably organic polyhydroxyl compounds having molecular weights of, for example, from 500 to 12,000, and, if desired, low molecular weight chain extenders and/or crosslinkers in the presence or absence of catalysts, blowing agents, auxiliaries and/or additives in an open or closed mold is known from numerous patent and literature publications. Appropriate selection of the formative components, eg. the organic polyisocyanates, the relatively high molecular weight compounds containing hydrogen atoms which react with NCO groups and possibly chain extenders and/or crosslinkers enable elastic or rigid, compact or cellular moldings comprising polyisocyanate polyaddition products and also all modifications lying between these to be produced by this procedure.

An overview of the production of moldings comprising, for example, cellular or compact PU cast elastomers, PU elastomers, PU foams, PIR foams, etc., their mechanical properties and their use is given, for example, in the Kunststoff-Handbuch, Volume VII, "Polyurethane", 1st edition, 1966, edited by Dr. R. Vieweg and Dr. A. Höchtlen, 2nd edition, 1983, edited by Dr. G. Oertel and 3rd edition, 1993, edited by Dr. G. W. Becker and Dr. D. Braun (Carl-Hanser-Verlag, Munich, Vienna) and "Integralschaumstoffe", edited by Dr. H. Piechota and Dr. H. Rohr (Carl-Hanser-Verlag, Munich, Vienna, 1975).

Although the production of compact or cellular, elastic or rigid PU or PIR moldings has achieved extraordinary industrial importance, the processes described also have technical deficiencies owing, for example, to the excellent adhesion of polyurethanes to other materials. A particular disadvantage is that the PU moldings adhere to the molds and are therefore difficult to remove therefrom, which frequently leads to damage to the molding, in particular to its surface. To avoid this disadvantage, use is generally made of polished metal molds, and/or the internal surfaces of the molds are sprayed before production of the moldings with an external mold release agent, for example a product based on wax, soaps or oil or a silicone oil. This method is not only time-consuming and costly, but can also, particularly in the case of silicone-containing mold release agents, lead to considerable problems in applying a surface coating.

To improve the self-releasing properties in the production of PU moldings, particularly PU-polyurea moldings by the RIM technique, "internal" mold release agents have been developed.

According to EP-A-0 153 639 (U.S. Pat. No. 4,581,387), PU-polyurea moldings are produced by the RIM technique using internal mold release agents comprising carboxylic esters and/or carboxamides which are prepared by esterification or amidation of a mixture of montanic acid and at least one aliphatic carboxylic acid having at least 10 carbon atoms with at least difunctional alkanol-amines, polyols and/or polyamines having molecular weights of from 60 to 400.

According to U.S. Pat. No. 4,519,965, internal mold release agents used in reaction injection molding are mixtures of at least one zinc carboxylate having from 8 to 24 carbon atoms in the carboxyl radical and nitrogen-containing polymers which react with isocyanate groups to improve the compatibility of the zinc carboxylate with the formative components used for polyurethane-polyurea production.

EP-A-0 255 905 (U.S. Pat. No. 4,766,172) describes a mold release composition and a process for producing elastic moldings, which mold release composition comprises a solution which is liquid at room temperature of a zinc salt of a higher aliphatic carboxylic acid in selected tertiary amino compounds of the formula $R^1R^2N(CH_2)_mNR(CH_2)_nNR^3R^4$.

According to DE-A-36 31 842 (U.S. Pat. No. 4,764,537), internal mold release agents for producing moldings by the polyisocyanate polyaddition process comprise at least one ketimine, aldimine, enamine and/or a cyclic Schiff base, at least one metal salt of an organic carboxylic acid having from 8 to 24 carbon atoms and at least one organic carboxylic acid, organic sulfonic acid, mineral acid or amidosulfonic acid. These mold release compositions display excellent release properties in essentially compact moldings containing urethane and urea groups and rigid polyurethane integral foams produced by the RIM technique.

However, disadvantages are that the moldings containing urethane groups and produced using chain extenders based on low molecular weight polyhydric alcohols and/or polyoxyalkylene polyols cure relatively slowly and have to be treated with 1,1,3-trichloro-ethane vapor to remove the grease before application of a surface coating.

To eliminate this disadvantage, elastic, essentially compact polyurethane moldings as described in EP-B-0 262 378 and DE-A-39 04 810 and flexible moldings containing urethane groups and having a compact surface zone and a cellular core as described in DE-A-39 04 812 are produced using an internal mold release agent comprising a mixture of at least one organic amine and at least one metal salt of stearic acid or a mixture of at least one organic amine, at least one ketimine and at least one metal salt of stearic acid in combination with at least one organic monocarboxylic and/or dicarboxylic acid or anhydride. An advantage of these processes is that the PU moldings produced require no surface treatment with 1,1,3-trichloroethane vapor. However, it has the disadvantage that large-area moldings, in particular those having complicated three-dimensional shapes, can be produced only with difficulty since the flow path of the reaction mixture is relatively short so that large-volume molds, particularly those having thin hollow spaces and narrow flow channels, are frequently filled only insufficiently or not at all at certain points.

Selection of the optimum mold release agent in each case usually requires not only a knowledge of the starting materials in the PU or PU-polyurea formulation, eg. the presence or absence of zinc stearate, sterically hindered aromatic diamines, polyoxyalkylene-polyamines, blowing agents, etc., but also the type of mold material, the nature of its surface and the mold geometry and also the arrangement of the filling openings. In most cases, the selection of the best mold release agent requires experimental optimization.

Further external and/or internal mold release agents for producing PU foams are described, for example, in EP 0 533 018 B1, DE-A-19 53 637, DE-A-21 21 670, DE-B-23 07 589, DE-A-23 56 692, DE-A-23 63 452, DE-A-24 04 310, DE-A-24 27 273, DE-A-24 31 968 and for producing PU moldings having a thickness in the range from 0.8 to 1.4 g/cm$^3$ in EP-A-0 265 781. Despite these many known methods, the problems involved in the self-release of PU or PU-polyurea moldings have not been able to be solved conclusively. The release action of the mold release agents used is frequently insufficient and/or the polyol component containing the mold release agents does not have a satisfactory shelf life.

Alkylsuccinic and alkenylsuccinic acids have already been used for producing polyisocyanate polyaddition products. According to EP-A-666 880 (WO 95/06673), alkali metal and alkaline earth metal salts of alkylsuccinic and alkenylsuccinic acids are suitable as catalysts for producing polyurethanes and/or polyureas, in particular foams comprising such polyaddition products, since the acids are able to advantageously influence the cell structure of the foams.

It is an object of the present invention to develop internal mold release agents which have a broad range of applications and are suitable for producing both compact and cellular moldings comprising polyisocyanate polyaddition products, for example polyaddition products containing urethane and/or urea and/or isocyanurate groups. The polyol components (A components) containing the mold release agents should be stable on storage and be able to be processed by an economical, environmentally friendly process to give compact or cellular, preferably large-area and/or large-volume, moldings which may contain reinforcing material or moldings having an essentially compact surface zone and a cellular core, viz. integral foams.

If the moldings obtained are to have a surface coating applied, it should be possible to omit, preferably completely, a pretreatment with organic solvents, in particular halogen-containing solvents.

We have found that this object is achieved by the use of diesters and/or monoesters of alkylsuccinic and/or alkenylsuccinic acids as internal mold release agents for producing the moldings comprising polyisocyanate polyaddition products.

The present invention accordingly provides a process for producing self-releasing, compact or cellular moldings which comprise polyisocyanate polyaddition products and may contain reinforcing material by reacting a) organic and/or modified organic polyisocyanates with b) at least one compound containing at least two reactive hydrogen atoms and having a molecular weight of from 62 to 10,000 and, if desired, c) chain extenders and/or crosslinkers in the presence of d) internal mold release agents and in the presence or absence of e) catalysts, f) blowing agents, g) reinforcing material and h) auxiliaries in an open or closed mold, with or without compaction, wherein the internal mold release agents used are diesters and/or monoesters of alkylsuccinic acids and/or diesters and/or monoesters of alkenylsuccinic acids.

The present invention further provides for the use of the alkylsuccinic diesters or monoesters and alkenylsuccinic diesters and/or monoesters, preferably selected from the group consisting of alkylsuccinic and alkenylsuccinic diesters and monoesters, poly(alkylsuccinic) and poly (alkenylsuccinic) polyesters or mixtures of alkylsuccinic diesters and/or monoesters and/or alkenylsuccinic diesters and/or monoesters and/or alkylsuccinamides and/or alkylsuccinimides and/or alkenylsuccinamides and/or alkenylsuccinimides, as internal mold release agents for producing moldings comprising polyisocyanate polyaddition products.

The internal mold release agents which can be used according to the present invention are free of metal ions, readily miscible with the other constituents of the polyol component (A component) and, owing to the good solubility, have a very good shelf life. Certain internal mold release agents of the present invention are also soluble in the B component. Materials added to the B component are preferably ones which, as discussed later, are starting substances for the mold release agents of the present invention. The alkylsuccinic and in particular alkenylsuccinic diesters and/or monoesters display a considerably improved release action in the production of moldings, essentially regardless of the composition of the polyol component. Owing to the broad range of uses of the individual PU systems, the novel mold release agents can be used equally well in producing compact or cellular moldings which contain urethane and urea groups and possibly isocyanurate groups and may contain reinforcing material or be free of reinforcing material.

Regarding the formative components (a) to (h) for producing the compact or cellular polyisocyanate polyaddition products and in particular regarding the internal mold release agents (d) which can be used according to the present invention and the starting materials for their preparation, the following may be said:

a) Suitable organic polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, eg. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanato-methylcyclohexane (isophorone diisocyanate), hexahydrotolylene 2,4- and 2,6-diisocyanate and also the corresponding isomer mixtures, dicyclohexylmethane 4,4'-2,2'- and 2,4'- diisocyanate and also the corresponding isomer mixtures, araliphatic diisocyanates such as m-, p-xylylene diisocyanate and xylylene diisocyanate isomer mixtures and preferably aromatic diisocyanates and polyisocyanates such as tolylene 2,4- and 2,6-diisocyanate and the corresponding isomer mixtures, diphenylmethane 4,4'-, 2,4', and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (raw MDI), mixtures of raw MDI and tolylene diisocyanates, naphthylene 1,4- and 1,5-diisocyanate, 3,3'-dimethylbiphenyl 4,4'-diisocyanate, 1,2-diphenylethane diisocyanate and phenylene diisocyanate. The organic diisocyanates and polyisocyanates can be used individually or in the form of mixtures.

Use is frequently also made of modified polyfunctional isocyanates, ie. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione, uretonimine and/or urethane groups. Specific examples are: organic, preferably aromatic, polyisocyanates containing urethane groups and having NCO contents of from 33.6 to 15% by weight, preferably from 31 to 21% by weight, based on the total weight, diphenylmethane 4,4'-diisocyanate modified, for example, with low molecular weight alkanediols, triols, dialkylene glycols, trialkylene glycols or polyoxyalkylene glycols having molecular weights of up to 6000, modified diphenylmethane 4,4'- and 2,4'-diisocyanate mixtures, or modified raw MDI or tolylene 2,4- or 2,6-diisocyanate, with examples of dialkylene or polyoxyalkylene glycols which can be used individually or as mixtures being: diethylene glycol, dipropylene glycol, polyoxyethylene, polyoxypropylene and polyoxypropylene-polyoxyethylene glycols, triols and/or tetrols. Also suitable are prepolymers containing NCO groups, having NCO contents of from 14 to 1.5% by weight, preferably from 8 to 2.5% by weight, based on the total weight, and prepared from the polyester polyols and/or preferably polyether polyols described below and naphthylene 1,4- and 1,5-diisocyanate, 3,3'-dimethylbiphenyl 4,4'-diisocyanate, 1,2-diphenylethane diisocyanate, phenylene diisocyanate and diphenylmethane 4,4'-diisocyanate, mixtures of diphenylmethane 2,4'- and 4,4'-diisocyanate, tolylene 2,4- and/or 2,6-diisocyanates or raw MDI. Further modified polyisocyanates which have been found to be useful are liquid polyisocyanates containing carbodiimide groups and/or isocyanurate rings and having NCO contents of from 33.6 to 15% by weight, preferably from 31 to 21% by weight, based on the total weight, for example those based on diphenylmethane 4,4'-, 2,4'- and/or 2,2'-diisocyanate and/or tolylene 2,4- and/or 2,6-diisocyanate.

If desired, the modified polyisocyanates can be mixed with one another or with unmodified organic polyisocyanates such as diphenylmethane 2,4'- and/or 4,4'-diisocyanate, raw MDI, tolylene 2,4- and/or 2,6-diisocyanate.

Organic polyisocyanates which have been found to be particularly useful and are preferably employed for producing cellular elastomers are: prepolymers containing NCO groups and having an NCO content of from 14 to 9% by weight, particularly those based on polyether polyols or polyester polyols and one or more diphenylmethane diisocyanate isomers, advantageously diphenylmethane 4,4'-diisocyanate and/or modified organic polyisocyanates containing urethane groups and having an NCO content of from 33.6 to 15% by weight, in particular those based on diphenylmethane 4,4'-diisocyanate or diphenylmethane diisocyanate isomer mixtures; for producing flexible polyurethane foams: mixtures of tolylene 2,4- and 2,6-diisocyanates, mixtures of tolylene diisocyanates and raw MDI or, in particular, mixtures of the abovementioned prepolymers based on diphenylmethane diisocyanate isomers and raw MDI; and for producing rigid polyurethane or polyurethane-polyisocyanurate foams: raw MDI.

b) As compounds b) containing at least two reactive hydrogen atoms, use is advantageously made of those having a functionality of from 1 to 8, preferably from 2 to 6, and a molecular weight of from 500 to 9000. Compounds which have been found to be useful are, for example, polyetherpolyamines and/or preferably polyols selected from the group consisting of polyether polyols, polyester polyols, polythioether polyols, hydroxyl-containing polyester amides, hydroxyl-containing polyacetals and hydroxyl-containing aliphatic polycarbonates or mixtures of at least two of the polyols mentioned. Preference is given to using polyester polyols and/or polyether polyols.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Suitable dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can here be used either individually or in admixture with one another. In place of the free dicarboxylic acids, it is also possible to use the corresponding dicarboxylic acid derivatives such as dicarboxylic monoesters and diesters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular alkanediols and dialkylene glycols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

To prepare the polyester polyols, the organic, for example aromatic and preferably aliphatic polycarboxylic acids and/or derivatives and polyhydric alcohols can be polycondensed in the absence of catalysts or preferably in the presence of esterification catalysts, advantageously in an atmosphere of inert gases such as nitrogen, carbon monoxide, helium, argon, etc., in the melt at from 150 to 250° C., preferably from 180 to 220° C., under atmospheric or reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distill off the water of condensation.

To prepare the polyester polyols, the organic polycarboxylic acids and/or derivatives and polyhydric alcohols are advantageously polycondensed in a molar ratio of 1:1–1.8, preferably 1:1.05 to 1.2.

To prepare low-fogging PU moldings, the polyester polyols are advantageously subjected before use to a distillation at from 140 to 280° C. under a reduced pressure of from 0.05 to 30 mbar, eg. a thin-film distillation, to remove volatile constituents.

The polyester polyols obtained preferably have a functionality of from 1 to 4, in particular from 2 to 3, and a molecular weight of from 500 to 3000, preferably from 1200 to 3000 and in particular from 1800 to 2500.

However, polyols which are particularly preferably used are polyether polyols which are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably from 2 to 6, reactive hydrogen atoms in bonded form, or by cationic polymerization using Lewis acids such as antimony penta-chloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Suitable initiator molecules are, for example: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, for example unalkylated, monoalkylated or dialkylated ethylenediamine, diethylene-triamine, triethylenetetramine, 1,3-propylenediamine, 1,3- or 1,4-butylenediamine, 1,2-, 1,3-, 1,4-, 1,5- and 1,6-hexamethylenediamine, phenylenediamines, 2,3-, 2,4, 3,4- and 2,6-tolylenediamine and 4,4'-, 2,4'- and 2,2'-diaminodiphenylmethane, N,N-dimethylaminodipropylenetriamine, N,N-dimethylaminopropane-1,3-diamine.

Further suitable initiator molecules are: alkanolamines such as ethanolamine, N-methylethanolamine and N-ethylethanolamine, dialkanolamines such as diethanolamine, N-methyldiethanolamine and N-ethyldiethanolamine and trialkanolamines such as triethanolamine, and ammonia. Preference is given to using polyhydric, in particular dihydric and/or trihydric, alcohols such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether polyols, preferably polyoxypropylene and polyoxypropylene-polyoxyethylene polyols, have a functionality of preferably from 2 to 3 and in particular from 2 to 2.6 and molecular weights of from 1800 to 9000, preferably from 2000 to 6500 and in particular from 2400 to 5200, for producing flexible moldings and a functionality of preferably from 3 to 8, in particular from 3 to 6, and molecular weights of from 500 to 2400, preferably from 600 to 1800 and in particular from 600 to 1500 for producing stiff, rigid moldings and suitable polyoxytetramethylene glycols have a molecular weight of up to about 3500.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyether polyols using methods similar to those written in the German Patents 11 11 394, 12 22 669 (U.S. Pat. Nos. 3,304,273, 3,383,351, 3,523,093), 11 52 536 (GB 10 40 452) and 11 52 537 (GB 987 618), and also polyether polyol dispersions which contain as dispersed phase, usually in an amount of from 1 to 50% by weight, preferably from 2 to 25% by weight: eg. polyureas, polyhydrazides, polyurethanes containing bonded tert-amino groups and/or melamine and are described, for example, in EP-B-011 752 (U.S. Pat. No. 4,304,708), U.S. Pat. No. 4,374,209 and DE-A-32 31 497.

Like the polyester polyols, the polyether polyols can be used individually or in the form of mixtures. They can also be mixed with the graft polyether polyols or polyester polyols or with the hydroxyl-containing polyester amides, polyacetals, polycarbonates and/or polyetherpolyamines.

Suitable hydroxyl-containing polyacetals are, for example, the compounds which can be prepared from glycols such as diethylene glycol, triethylene glycol, 4,4'-dihydroxyethoxy-diphenyldimethylmethane or hexanediol and formaldehyde. Suitable polyacetals can also be prepared by polymerization of cyclic acetals.

Suitable hydroxyl-containing polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The hydroxyl-containing polyesteramides include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and aminoalcohols, and/or polyamines.

Suitable polyetherpolyamines can be prepared from the abovementioned polyether polyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols using amines or ammonia in the presence of hydrogen and catalysts (DE 12 15 373).

c) The polyisocyanate polyaddition products can be prepared with or without concomitant use of difunctional chain extenders and/or trifunctional and higher-functional crosslinkers. However, the addition of chain extenders, crosslinkers or, if desired, mixtures thereof can prove to be advantageous for modifying the mechanical properties, eg. the hardness. To produce compact and cellular PU or PU-polyurea elastomers, thermoplastic polyurethanes and flexible PU foams, it is advantageous to use chain extenders and possibly crosslinkers. Chain extenders and/or crosslinkers used are diols and/or triols having molecular weights of less than 500, preferably from 60 to 300. Suitable chain extenders/crosslinkers are, for example, dialkylene glycols and aliphatic, cycloaliphatic and/or araliphatic diols having from 2 to 14, preferably from 4 to 10, carbon atoms, eg. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane and low molecular weight hydroxyl-containing polyalkylene oxides based on ethylene oxide and/or 1,2-propylene oxide and the abovementioned diols and/or triols as initiator molecules.

To produce cellular polyurethane(PU)-polyurea elastomers, it is also possible to use secondary aromatic diamines, primary aromatic diamines, 3,3'-dialkyl- and/or 3,3',5,5'-tetra- and alkyl-substituted diaminodiphenylmethanes as chain extenders or crosslinkers in place of the abovementioned diols and/or triols or in admixture with these.

Examples of secondary aromatic diamines are: N,N'-dialkyl-substituted aromatic diamines which may, if desired, be substituted by alkyl radicals on the aromatic ring and have from 1 to 20, preferably from 1 to 4, carbon atoms in the N-alkyl radical, eg. N,N'-diethyl-, N,N'-di-sec-pentyl-, N,N'-di-sec-hexyl-, N,N'-di-sec-decyl-, N,N'-dicyclohexyl-p- or -m-phenylenediamine, N,N'-dimethyl-, N,N'-diethyl-, N,N'-diisopropyl-, N,N'-di-sec-butyl-, N,N'-dicyclohexyl-4,4'-diaminodiphenylmethane and N,N'-di-sec-butylbenzidine.

Aromatic diamines which are advantageously used are those which have at least one alkyl substituent in the ortho position relative to the amino groups, are liquid at room temperature and are miscible with the component (b), in particular the polyether polyols. Aromatic diamines which have been found to be useful are, for example, alkyl-substituted meta-phenylenediamines of the formulae

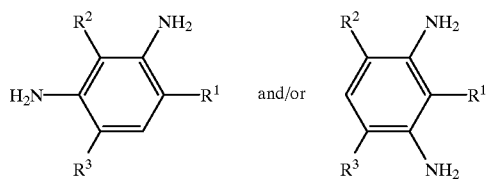

where $R^3$ and $R^2$ are identical or different and are each a methyl, ethyl, propyl or isopropyl radical and $R^1$ is a linear or branched alkyl radical having from 1 to 10, preferably from 4 to 6, carbon atoms.

Alkyl radicals $R^1$ which have been found to be particularly useful are those in which the branched point is located on the $C^1$ carbon atom. Examples or radicals $R^1$ are the methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl and preferably the cyclohexyl, 1-methyl-n-propyl, tert-butyl, 1-ethyl-n-propyl, 1-methy-n-butyl and 1,1-dimethyl-n-propyl radical.

Examples of suitable alkyl-substituted n-phenylenediamines are: 2,4-dimethyl-6-cyclohexyl-, 2-cyclohexyl-4,6-diethyl-, 2-cyclohexyl-2,6-isopropyl-, 2,4-dimethyl-6-(1-ethyl-n-propyl)-, 2,4-dimethyl-6-(1,1-dimethyl-n-propyl)-, 2-(1-methyl-n-butyl)-4,6-dimethyl-phenylene-1,3-diamine. Preference is given to using 1-methyl-3,5-diethyl-2,4- or -2,6-phenylenediamine, 2,4-dimethyl-6-tert-butyl-, 2,4-dimethyl-6-isooctyl- and 2,4-dimethyl-6-cyclo-hexyl-phenylene-1,3-diamine.

Suitable 3,3'-di- and 3,3',5,5'-tetra-n-alkyl-substituted 4,4'-diaminodiphenylmethanes are, for example, 3,3'-dimethyl-, 3,3',5,5'-tetramethyl-, 3,3'-diethyl-, 3,3',5,5'-tetraethyl-, 3,3'-di-n-propyl and 3,3',5,5'-tetra-n-propyl-4,4'-diaminodiphenylmethane.

Preference is given to diaminodiphenylmethanes of the formula

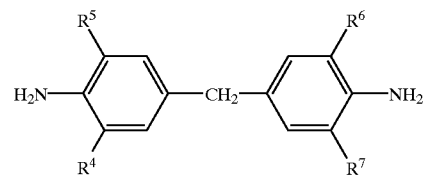

where $R^4$, $R^5$, $R^6$ and $R^7$ are identical or different and are each a methyl, ethyl, propyl, isopropyl, sec-butyl or tert-butyl radical, but where at least one of the radicals has to be an isopropyl or sec-butyl radical. The 4,4'-diaminodiphenylmethanes can also be used in admixture with isomers of the formulae

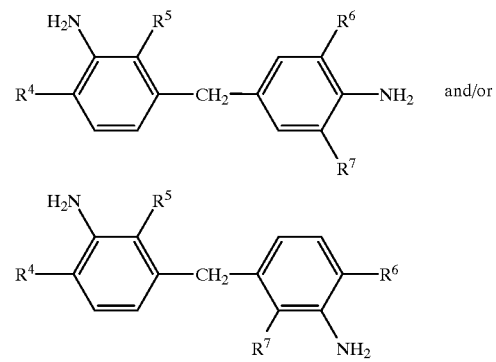

where $R^4$, $R^5$, $R^6$ and $R^7$ are as defined above.

Preference is given to using 3,5-dimethyl-3',5'-diisopropyl- and 3,3',5,5'-tetraisopropyl-4,4'-diaminodiphenylmethane. The diaminodiphenylmethanes can be used individually or in the form of mixtures.

The chain extenders and/or crosslinkers (c) mentioned can be used individually or as mixtures of similar or different types of compounds.

If chain extenders, crosslinkers or mixtures thereof are employed, they are advantageously used in amounts of from 2 to 60% by weight, preferably from 8 to 50% by weight and in particular from 10 to 40% by weight, based on the weight of the component (b).

(d) According to the present invention, internal mold release agents (d) used are alkylsuccinic diesters, alkenylsuccinic diesters, alkylsuccinic monoesters and alkenylsuccinic monoesters or mixtures of these diesters and monoesters. The alkyl or preferably alkenyl groups can be linear or preferably branched and advantageously have a mean molecular weight $M_n$ (number average) of from 250 to 3000, preferably from 800 to 2300 and in particular from 900 to 1400. The alkyl groups preferably comprise polyethylene, polyisopropylene and polyisobutylene radicals and the alkenyl groups preferably comprise polyphenyl, polyisopropenyl and in particular polyisobutenyl radicals.

The alkylsuccinic or alkenylsuccinic diesters or monoesters can be prepared by known methods, for example by reacting alkylsuccinic or alkenylsuccinic acid and/or the corresponding alkylsuccinic or alkenylsuccinic acid derivatives such as monochlorides and/or dichlorides and in particular anhydrides with primary and/or secondary organic, preferably aliphatic and/or cycloaliphatic monoalcohols and/or polyalcohols. According to a preferred embodiment, the alkylsuccinic or alkenylsuccinic esters are prepared by reacting the alkylsuccinic or alkenylsuccinic anhydrides with primary and/or secondary, aliphatic and/or cycloaliphatic monools and/or polyols, if desired in admixture with alkylsuccinamides and/or alkylsuccinimides and/or alkenylsuccinamides and/or alkenylsuccinimides.

As formative components for preparing the alkylsuccinic or alkenylsuccinic diesters or monoesters, preference is given to using alkylsuccinic or alkenylsuccinic anhydrides as are described, for example, in EP-A-666 880 (WO 94 00 937), DE-A-28 08 105 (U.S. Pat. No. 4,234,435) EP-A-0 632 071 (U.S. Pat. No. 5,420,207) or EP-A-0 629 638. However, other suitable starting materials are alkylsuccinic or alkenylsuccinic acids and acid derivatives, eg. monohalides and/or dihalides and preferably anhydrides of alkylsuccinic or alkenylsuccinic acids, as are described, for example, in EP-A-0 457 599, homopolymers of polyalkenyl-substituted succinic acid or derivatives, preferably anhydrides, copolymers of the abovementioned polyalkenyl-substituted succinic acids and/or succinic acid derivatives and olefinically unsaturated monomers having from 2 to 30 carbon atoms and copolymers of maleic anhydride, polyisoalkenes, preferably polyisopropene and in particular polyisobutene, and olefinically unsaturated monomers having from 2 to 30 carbon atoms, preferably from 18 to 24 carbon atoms. Suitable polymeric substances as formative components for the mold release agents of the present invention are also described in WO 90/03359. The substances described there can be reacted as in WO 90/03359 to give imides, amides, diesters or monoesters.

The preparation and work-up of suitable polyisobutylene is described, for example, in EP-A-628 575.

DE-A-28 08 105 (U.S. Pat. No. 4,234,435), the complete contents of which are incorporated by references into the present description, describes the starting components used for the preparation of the internal mold release agents used according to the present invention and also the preparation and the after-treatment of the compounds which can be used as internal mold release agents and also their suitability as additives for mineral lubricating oils.

A further group of succinic acid derivatives which can be converted into the internal mold release agents which can be used according to the present invention is described in WO 95/07944. These are copolymers comprising
 a) from 20 to 60 mol % of maleic acid or maleic anhydride,
 b) from 10 to 70 mol % of at least one oligomer of propane or a branched 1-olefin having from 4 to 10 carbon atoms, having a mean molecular weight $M_w$ of from 300 to 5000, and
 c) from 1 to 50 mol % of at least one monoethylenically unsaturated compound which can be copolymerized with the monomers a) and b).
Monomers c) used are
 monoethylenically unsaturated $C_3$–$C_{10}$-monocarboxylic acids linear 1-olefins having from 2 to 40 carbon atoms
 vinyl and alkyl allyl ethers having from 1 to 40 carbon atoms in the alkyl radical.

In principle, it is also possible to replace maleic acid and maleic anhydride either partially or completely by other olefinically unsaturated carboxylic acids. However, owing to their better availability and better processibility, use is usually made of maleic acid and/or maleic anhydride.

Suitable alcohols for preparing the internal mold release agents used according to the present invention are accordingly those of the formula (hereinafter referred to as component A)

where $R^3$ is a monovalent or polyvalent organic radical having the structure Y

which is bonded to the OH groups via C—O bonds, where the carbon atom is not a constituent of a carbonyl group and m is an integer from 1 to about 16, preferably from 2 to 6. The alcohols can be aliphatic, cycloaliphatic, aromatic or heterocyclic, eg. aliphatically substituted heterocyclic, cycloaliphatically substituted aromatic, cycloaliphatically substituted heterocyclic, heterocyclically substituted aliphatic, heterocyclically substituted cycloaliphatic and heterocyclically substituted aromatic alcohols. With the exception of the polyoxyalkylene alcohols, the monohydric and polyhydric alcohols of the formula X usually contain not more than about 40 carbon atoms. Polyhydric alcohols are preferred since the diesters and/or monoesters of the present invention derived therefrom have extraordinarily good release properties. Examples of polyoxyalkylene alcohols which are suitable as building blocks for the mold release agents of the present invention are polyoxyalkylene alcohol demulsifiers for aqueous emulsions. For the purpose of the present invention, "demulsifiers" for aqueous emulsions are polyoxyalkylene alcohols which prevent or retard the formation of aqueous emulsions or break aqueous emulsions; "aqueous emulsions" are oil-in-water or water-in-oil emulsions. Numerous commercial polyoxyalkylene alcohol demulsifiers can be used as A). These include the reaction product of various organic amines, carboxamides and quaternary ammonium salts with ethylene oxide. Such polyethoxylated amines, amides and quaternary salts, ethylene oxide condensates of N-alkylalkylenediamines or tertiary amines are the ethylene oxide condensates of primary fatty acid amines; ethylene oxide condensates of fatty acid amides; polyethoxylated quaternary ammonium salts, eg. quaternary ammonium chlorides are commercial products.

Preferred demulsifiers as component A are liquid polyoxyalkylene alcohols and their derivatives. Suitable derivatives are, for example, hydrocarbyl ethers and carboxylic esters which are obtained by reacting the alcohols with various carboxylic acids. Specific hydrocarbyl radicals are, for example, alkyl, cycloalkyl, alkylaryl, aralkyl, and alkylarylalkyl radicals having up to about 40 carbon atoms, for example methyl, butyl, dodecyl, tolyl, phenyl, naphthyl, dodecylphenyl, p-octylphenylethyl and cyclohexyl groups. The ester derivatives can be prepared using, for example, monocarboxylic and polycarboxylic acids such as acetic acid, valeric acid, lauric acid, stearic acid and oleic acid, and polyols or liquid triols derived from ethylene oxide and propylene oxide and having an average molecular weight of from 4000 to 5000 as well as dodecylphenyl or nonylphenyl polyethylene glycol ethers and polyalkylene glycols and various derivatives which are commercial products.

Further products which are useful as component A are compounds which are derived from the above and have, on average, at least one free alcoholic hydroxyl group per polyoxyalkylene molecule. In the case of these demulsifiers, a hydroxyl group is designated as alcoholic when it is bound to a carbon atom which is not a constituent of an aromatic ring. The preferred polyoxyalkylene polyols as component A include polyols which have been prepared as block polymers. For this purpose, a hydroxy-substituted compound $R^4$-$(OH)_q$ (where q is from 1 to 10 and $R^4$ is, for example, the radical of a monohydric or polyhydric alcohol or a monohydric or polyhydricphenol or naphthol) is reacted with an alkylene oxide

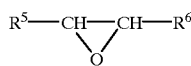

(where $R^5$ is hydrogen or a lower alkyl radical having up to 4 carbon atoms, $R^6$ is hydrogen or is as defined for $R^5$, with the proviso that the alkylene oxide contains not more than 10 carbon atoms) to form a hydrophobic base compound. This compound is then reacted with ethylene oxide to form a hydrophilic part, resulting in a molecule having hydrophobic and hydrophilic regions. The preparation of polyols having hydrophilic and hydrophobic regions is known. Depending on the system formulation of the polyurethane A component, targeted use is made of polyols which are converted as A) into mold release agents which, if desired, have a relatively high proportion of hydrophobic regions. However, it can also be advantageous to increase the hydrophilic proportion.

Examples of compounds of the formula $R^3$—$(OH)_m$ are aliphatic polyols such as alkylene glycols and alkane polyols, eg. ethylene glycol, propylene glycol, trimethylene glycol, triethylene glycol, 1,6-hexanediol, glycerol, pentaerythritol, dipentaerythritol, erythritol, sorbitol, sorbitan, xylose, dextrose, fructose, glucose, lactose, mannitol, sugar acids, xylitol, dextrins, dextrans, castor oil, malic acid, glyceric acid, tetracosanol, glyceraldehyde, tartaric acid, glucuronic acid, arabinose, fructose, sorbose, cetyl alcohol, lanolin alcohol, and also aromatic hydroxy compounds such as alkylated monohydric and polyhydric phenols and naphthols, eg. cresols, heptylphenols, dioctylphenols, resorcinol, pyrogallol. Further suitable polyoxyalkylene polyols as component A) are those having from 2 to 4 hydroxyl groups and molecules which consist essentially of hydrophobic parts containing

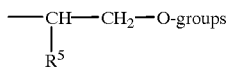

(where $R^5$ is a lower alkyl radical having up to 3 carbon atoms) and hydrophilic parts containing —$CH_2$—$CH_2$—O— groups. Such polyols can be prepared by first reacting a compound of the formula $R^3$-$(OH)_m$ (where $m$ is from 2 to 6) with a terminal alkylene oxide of the formula

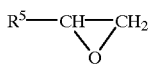

and then reacting the product with ethylene oxide. Examples of $R^3$-$(OH)_m$ are: TMP (trimethylolpropane), TME (trimethylol-ethane), ethylene glycol, trimethylene glycol, tetramethylene glycol, tri-(β-hydroxypropyl)amine, 1,4-(2-hydroxyethyl)cyclohexane, N,N,N',N'-tetrakis-(2-hydroxypropyl)ethylenediamine, N,N,N',N'-tetrakis-(2-hydroxyethyl)ethylenediamine, tri-(β-hydroxyethyl)amine, N,N-dimethylaminopropanamine-1,3, N,N-dimethylaminodipropylenetriamine, naphthol, alkylated naphthols, resorcinol. To be suitable as component A) for preparing the internal mold release agents, the polyoxyalkylene alcohols should have a mean molecular weight of from about 500 to 10,000, preferably from about 200 to 7000. The oxyethylene groups (—$CH_2$—$CH_2$—O—) normally make up from about 5 to 40% of the total average molecular weight.

The polyols mentioned are very useful as component A) for preparing the internal mold release agents of the present invention. The polyols mentioned can be reacted with inorganic acids such as boric acid, o-phosphoric acid, sulfuric acid, organic sulfonic acid, amidosulfonic acid or lower monocarboxylic and/or polycarboxylic acids and/or their partial esters, eg. phosphocarboxylic acids, formic acid, acetic acid, maleic acid, maleic monoesters, lactic acid or citric acid, or with fatty acids such as those derived from soybean oil, olive oil, sunflower oil, linseed oil, resin oil, pine oil, lanolin, tall oil, fish oil, rapeseed oil and palm oil or ricinoleic acid, but in particular oleic acid, (iso)stearic acid, montanic acids, rosin acids, phenyl-alkylcarboxylic acids or phthalic acid or maleic monoesters of long-chain fatty alcohols, with the proviso that one OH group remains free. In general, no esterification takes place in the case of the above-described basic polyoxyalkylene polyols but rather a salt is formed with the acids mentioned. It has been found to be advantageous to use not the stoichiometric amount but rather a deficiency of the acids, in particular the fatty acids mentioned. Both the partial esters and the salts are very useful as component A for preparing the mold release agents of the present invention.

Polyoxyalkylene polyols having a mean molecular weight of from about 2500 to 6000 in which from 10 to 20% by weight of the molecule is made up by the oxyethylene groups give monoesters having particularly good properties as component A for preparing the internal mold release agents.

Examples of such polyoxyalkylene polyols are

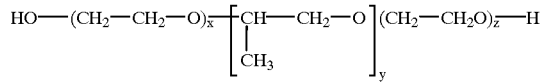

where x,y and z are integers greater than 1 so that the —$CH_2$—$CH_2$O— groups make up from about 10 to 15% by weight of the total molecular weight as glycols, with the average molecular weight of the polyols being from about 2500 to 4500. This type of polyol is prepared by reacting propylene glycol first with propylene oxide and then with ethylene oxide. The corresponding monoesters of these polyols are prepared using the abovementioned fatty acids.

Another group of preferred polyoxyalkylene alcohols as precursor A) are the liquid polyols of the following structure:

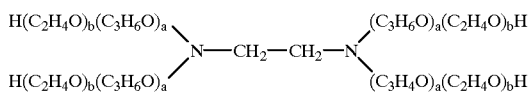

They are described in U.S. Pat. No. 2,979,528. These polyols can be prepared by reacting an alkylenediamine such as ethylenediamine, propylenediamine or hexamethylenediamine with propylene oxide and subsequently with ethylene oxide. The molecular weight is up to 10000.

A further polyether which is useful as component A) is a triol having a mean molecular weight of from about 4000 to 5000 and derived from propylene oxide and ethylene oxide, where the oxyethylene groups make up about 18% by weight of the triol. The triols are prepared by reacting glycerol, TME or TMP with propylene oxide to form a hydrophobic part and subsequently preparing the hydrophilic parts using ethylene oxide.

Further suitable polyethers A) are alkylene glycols and polyoxyalkylene alcohols such as polyoxyethylene alcohols, polyoxypropylene alcohols and polyoxybutylene alcohols. These polyglycols can contain up to about 150 oxyalkylene units, with the alkylene radical containing from 2 to 8 carbon atoms. These polyoxyalkylene alcohols are generally dihydric alcohols, ie. each molecule has two hydroxyl groups as end groups. For these polyols to be suitable as A), they have to contain at least one such hydroxyl group. The remaining hydroxyl groups can be reacted with a monobasic, aliphatic or aromatic carboxylic acid having up to about 30 carbon atoms, for example formic acid, acetic acid, propionic acid, butyric acid, valeric acid, n-caproic acid, caprylic acid, capric acid, lauric acid, palmitic acid, stearic acid, sugar acids such as lactic acid or citric acid or tartaric acid as well as benzoic acid, in particular fatty acids, eg. those derived from soybean oil, olive oil, sunflower oil, linseed oil, resin oil, pine oil, lanolin, tall oil, fish oil, rapeseed oil and palm oil, ricinoleic acid, linoleic acid, linolenic acid, in particular oleic acid, montanic acids, rosin acids, phthalic acid or maleic monoesters of long-chain fatty alcohols, with the proviso that one OH group remains free. When using polyoxyethylene glycols which have a hydrophilic character, the abovementioned fatty acids have been found to be particularly useful as hydrophilic acids.

Examples which may be mentioned are PEG-400 monostearate, PEG-400 monooleate and PEG-150 monolaurate, where PEG is a polyoxyethylene glycol. The numbers indicate the mean molecular weight.

Products of the type described are commercial products. Further products are POE (20) sorbitan monolaurate, POE (20) sorbitan monooleate, POE (20) sorbitan trioleate, POE (5) sorbitan trioleate and POE (20) lanolate. These products too are commercial products. POE represents the polyoxyethylene radical and POE (20) denotes 20 ethylene oxide units. The number in brackets is the number of ethylene oxide units. It is important that at least one hydroxyl group is present in the molecule before the products are reacted with polyisobutylenesuccinic anhydride. Further examples are POE (5) lanolate, POE (20) lanolate. Also suitable are the monoesters of maleic acid with fatty alcohols. Polyoxypropylene glycols which have an average molecular weight of from 600 to 4500 are suitable for preparing monoesters. Preference is given to using carboxylic acids having up to 20 carbon atoms. Also suitable are sugar acids such as lactic acid, citric acid, boric acid, phosphoric acid, maleic monoesters of alkyl-substituted alkylphenols, which are reacted with up to 25 mol of ethylene oxide. Also useful are the monoesters of maleic acid with polyoxyethylene glycols. The polyhydric alcohols mentioned are likewise suitable as A). They preferably contain from 2 to 10 hydroxyl groups. Examples are ethylene glycol, diethylene glycol, 1,2-propanediol, triethylene glycol, tetraethylene glycol, dipropylene glycol, tripropylene glycol, dibutylene glycol, tributylene glycol and other alkylene glycols and polyoxyethylene glycols in which the alkyl radicals contain from 2 to about 8 carbon atoms.

Examples which may be mentioned are propylene glycol monolaurate, propylene glycol monoricinoleate, propylene glycol monostearate, ethylene glycol monostearate, diethylene glycol monolaurate.

The monoethers of these alkylene glycols and polyalkylene glycols are likewise suitable as A). Examples are the monoarylene ethers, monoalkyl ethers and monoaralkyl ethers of these alkylene glycols and polyoxyalkylene glycols. This group has the formula

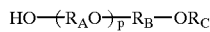

where $R_c$ is an aryl radical, eg. a phenyl, lower alkoxyphenyl or lower alkylphenyl group, a lower alkyl radical, eg. an ethyl, propyl, tert-butyl or phenyl group, or an aralkyl radical, eg. a benzyl, phenylethyl, phenylpropyl or p-ethylphenylethyl group, p is from 0 to about 150 and $R_A$ and $R_B$ are lower alkylene radicals having from 2 to about 3, preferably from 2 to 4, carbon atoms. Polyoxyalkylene glycols in which the alkylene radicals are ethylene or propylene groups and p is at least 2, and also their monoethers, are preferred. Further suitable monohydric and polyhydric alcohols (A) are aromatic monohydroxy and polyhydroxy compounds. Monohydric and polyhydric phenols and naphthols are preferred aromatic hydroxy compounds. The aromatic hydroxy compounds can contain not only the hydroxy substituents but also further substituents such as halogen atoms or alkyl, alkenyl, alkoxy, alkylmercapto or nitro groups. The aromatic hydroxy compounds usually contain from 1 to 4 hydroxyl groups. Specific examples of aromatic hydroxy compounds are: phenol, p-chlorophenol, p-nitrophenol, β-naphthol, α-naphthol, cresoles, resorcinol, catechol, carvacrol, thymol, eugenol, p,p'-dihydroxybiphenyl, hydroquinone, pyrogallol, phloroglucinol, hexylresorcinol, orcinol, guajacol, 2-chlorophenol, 2,4-dibutylphenol, (propene tetramer)-substituted phenol, didodecylphenol, 4,4'-methylene-bismethylene-bisphenol, α-decyl-β-naphthol, polyisobutenyl(molecular weight about 1000)-substituted phenol, the condensation product of heptylphenol and 0.5 mol of formaldehyde, the condensation product of octylphenol and acetone, di(hydroxyphenyl) oxide, di(hydroxyphenyl) sulfide, di(hydroxyphenyl) disulfide and 4-cyclohexylphenol. Particular preference is given to phenol and phenols substituted by aliphatic hydrocarbon radicals, eg. alkylated phenols having up to three aliphatic hydrocarbon substituents. Each of the aliphatic hydrocarbon substituents can contain 100 or more carbon atoms, but usually contains from 1 to 30 carbon atoms. Alkyl and alkenyl radicals are preferred aliphatic hydrocarbon substituents.

Further specific alcohols as component A are monohydric alcohols such as methanol, ethanol, isopropanol, isooctanol, dodecanol, cyclohexanol, cyclopentanol, behenyl alcohol, hexatriacontanol, neopentyl alcohol, isobutanol, benzyl alcohol, β-thenyl alcohol, 2-methylcyclohexanol, β-chlorohexanol, ethylene glycol monomethyl ether, ethylene glycol monobutyl ether, diethylene glycol monopropyl ether, triethylene glycol monododecyl ether, ethylene glycol monostearate, diethylene glycol monostearate, sec-pentyl alcohol, tert-butanol, σ-bromododecanol, glyceryl dioleate, lanolin alcohol, cholesterol, POE (5) lanolin alcohol, (POE) (10–40) lanolin alcohol, allyl alcohol, cetyl alcohol, cinnamyl alcohol, 1-cyclohexan-3-ol and oleyl alcohol. Also suitable are fatty alcohol ethers such as polyoxypropylene (10) cetyl alcohol, polyoxypropylene (20) cetyl alcohol, polyoxypropylene (15) stearyl alcohol. Although the alcohols are in principle suitable as component A, it is of course also possible to use the abovementioned ether derivatives prepared by reacting, in particular, the fatty alcohols with ethylene oxide. Such substances can also be obtained by reacting higher fatty acids with ethylene oxide. Examples which may be mentioned are POE (5) oleic acid or POE (20) lanolin fatty acid.

Other specific alcohols A) are ether alcohols and amino alcohols, eg. oxyalkylene-, oxyarylene-, aminoalkylene- and aminoarylene-substituted alcohols having one or more oxyalkylene, aminoalkylene or aminoarylene-oxyarylene radicals. Examples of such alcohols are the monoalkyl and dialkyl ethers of ethylene glycol and diethylene glycol, phenoxyethanol, heptylphenyl-(oxypropylene)$_6$-OH, octyl-(oxyethylene)$_{30}$-OH, phenyl-(oxyethylene) $_{30}$-OH, phenyl-(oxyoctylene)$_2$-OH, mono(heptylphenyloxypropylene)-substituted glycerol, poly styrene oxide), aminoethanol, 3-aminoethylpentanol, di(hydroxyethyl)amino-p-aminophenol, tri(hydroxypropyl)amine, N-hydroxyethylethylenediamine and N,N,N',N'-tetrahydroxytrimethylenediamine, tri(hydroxyethyl)amine, N,N,N',N'-tetrakis(2-hydroxyethyl)-ethylenediamine and N,N,N',N'-tetrakis(2-hydroxypropyl)-ethylenediamine and also the oxyalkylene derivatives thereof and the reaction product of ethylenediamine with 4 mol of propylene oxide. These products can also be reacted with ethylene oxide and/or propylene oxide. They can also be partially esterified with monocarboxylic acids.

Further polyhydric alcohols which can be used as A are glycerol, glyceryl monooleate, glyceryl monostearate, glycerol monomethyl ether, pentaerythritol, n-butyl 9,10-dihydroxystearate, methyl 9,10-dihydroxystearate 1,2-butanediol, 2,3-hexanediol, 2,4-hexanediol, pinacol, erythritol, arabitol, sorbitol, sorbitan, 1,2-cyclohexanediol, xylene glycol, carbohydrates such as sugar, starch, celluloses, etc. Examples of carbohydrates are glucose, fructose, sucrose, xylose, dextrose, lactose, mannitol, xylitol, rhamnose, dulcitol, glyceraldehyde and galacturonic acid.

Polyhydric alcohols having at least 3 hydroxyl groups of which some but not all have been reacted with an aliphatic monocarboxylic acid having from 8 to 30 carbon atoms, eg. with caprylic acid, oleic acid, stearic acid, linoleic acid, lauric acid, tall oil fatty acid, or ricinoleic acid, are particularly suitable as A). Further examples of such partially reacted polyhydric alcohols are sorbitol monooleate, sorbitol distearate, glyceryl monooleate, glyceryl dioleate, erythritol dilaurate, sorbitan monooleate and sorbitan trioleate. The free OH groups of the sorbitan products can be ethoxylated, eg. (POE) (20) sorbitan trioleate. Anhydrohexitols are prepared by dehydrating hexitols (eg. sorbitol, manitol and dulcitol), ie. by dehydrating hexahydric, aliphatic, straight-chain and saturated alcohols having 6 carbon atoms. Removal of a water molecule from hexitols gives the monoanhydrohexitols, also known as hexitans (eg. sorbitan) and removal of two molecules of water gives the dianhydrohexitols, also known as hexides (eg. sorbide or isosorbide).

As indicated above, sorbitan can be ethoxylated or esterified. The ethoxylated product can then also be esterified with a carboxylic acid, in particular a hydroxy acid. The esterification can be carried out using sugar acids or hydroxy fatty acids such as ricinoleic acid and/or fatty acids from fish oil.

Sorbitan can be esterified using caproic acid, octanoic acid, capric acid, lauric acid, myristic acid, palmitic acid, stearic acid, eicosanoic acid, behenic acid, laurolinic acid, myristoleic acid, palmitoleic acid, oleic acid, ricinoleic acid, linoleic acid, linolenic acid, coconut oil fatty acid, lanolin fatty acid, tallow fatty acid and palm oil fatty acid.

Preferred alcohols as component A) are polyhydric alcohols having up to about 12 carbon atoms, in particular from 3 to 10 carbon atoms. Examples of these are glycerol, erythritol, pentaerythritol, dipentaerythritol, gluconic acid, glyceraldehyde, glucose, arabinose, 1,7-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis(hydroxymethyl)cyclohexanol, 1,10-decanediol and digitoxose. A further group of preferred components A) are polyhydric alkanols having from 3 to 10 carbon atoms and at least 3 hydroxyl groups. Examples are: glycerol, erythritol, pentaerythritol, mannitol, sorbitol, sorbitan, 2-hydroxymethyl-2-methyl-1,3-propanediol (trimethylolethane), trimethylolpropane, 1,2,4-hexanetriol.

Amino alcohols which are suitable as A) generally contain only tertiary amino groups. Amino alcohols containing primary, secondary and tertiary amino groups are less suitable. Examples of compounds containing tertiary amino groups are triethanolamine, triisopropanolamine, N,N,N',N'-tetrakis(2-hydroxypropyl)ethylenediamine, tri(2-hydroxyethyl)amine, N-(2-hydroxyethyl)morpholine, N-(2-hydroxyethyl)piperidine, N,N-di(2-hydroxyethyl)glycine and their ethers with aliphatic alcohols. Further suitable aminoalcohols may be found in the literature.

Further compounds which are useful as component A) are OH- containing vegetable and animal oils and fats, eg. castor oil and lard oil. Castor oil and its reaction products with ethylene oxide and/or propylene oxide are particularly suitable. Also suitable are compounds as are described in EP 0 554 590. Further suitable compounds are alkylene oxide polymers and copolymers and their derivatives in which the terminal hydroxyl groups have been modified by, for example, esterification or etherification. Examples of such oils are the polymerization products of ethylene oxide or propylene oxide, the alkyl and aryl ethers of these polyoxyalkylene polymers (eg. polyisopropylene glycol methyl ether having a mean molecular weight of 1000, polyethylene glycol diphenyl ether having a molecular weight of 1000, polyethylene glycol diphenyl ether having a molecular weight of from 500 to 1000 or polypropylene glycol diethyl ether having a molecular weight of from 1000 to 1500) or their monocarboxylic and polycarboxylic esters, eg. acetic esters, mixed $C_3$–$C_8$-fatty acid esters or $C_{13}$-oxo acid diesters or tetraethylene glycol.

A further class is the esters of dicarboxylic acids (eg. phthalic acid, succinic acid, alkylsuccinic acids and alkenylsuccinic acids, maleic acid, azelaic acid, suberic acid, sebacic acid, fumaric acid, adipic acid, linoleic acid diamer, malonic acid, alkylmalonic acids or alkenylmalonic acids) with various alcohols (eg. butanol, hexanol, dodecyl alcohol, 2-ethylhexyl alcohol, ethylene glycol, diethylene glycol monoether or propylene glycol). Specific examples of such esters are dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer and the ester prepared by reacting 1 mol of sebacic acid with 2 mol of tetraethylene glycol and 2 mol of 2-ethylcaproic acid.

Other esters which are suitable as synthetic oils are derived, for example, from $C_5$–$C_{30}$- monocarboxylic acids and polyols or polyol ethers such as neopentyl glycol, trimethylol propane, pentaerythritol, dipentaerythritol or tripentaerythritol.

Further esters are those based on aromatic or aliphatic dicarboxylic acids and alcohols, particularly in combination with oleic acid.

The mold release agents of the present invention are prepared by known methods. The reaction is generally carried out in such a way that from about 50 to 75% of the carboxyl groups are reacted. The internal mold release agents described are also suitable in combination with synthetic lubricants based on aromatic and aliphatic hydrocarbons or mineral oils. Preference is here given to reaction products of PIBSA and polyols. Suitable starting materials for the mold release agents of the present invention also include the compounds mentioned in claim 1b.

After the reaction, remaining acid groups can be deactivated by reaction with groups reactive toward acid groups. Compounds suitable for this purpose are listed in U.S. Pat. No. 4,234,435. Examples which may be mentioned here are boron compounds, phosphorus compounds, epoxides and formaldehyde. It is also possible to deactivate the free carboxyl groups with metal ions. Although the internal mold release agents of the present invention are preferably used in metal-free form and this brings advantages, for example a better surface of the moldings, there are indeed also applications in which the presence of metal ions is possible.

The amount of internal mold release agents used is, depending on the geometry and material of the molding, from 0.01 to 5 parts by weight, based on the component b) and can readily be determined by preliminary experiments. The internal mold release agents are usually added to the polyol component. However, it can also be advantageous to add them to the isocyanate component. It has been found to be useful to add the precursors of the internal mold release agents (not acylated).

The internal mold release agents used according to the present invention are very readily soluble in the formative components of polyurethanes and therefore have a good release action even in the case of moldings having a large area or complicated shapes.

(e) Catalysts (e) used for producing the polyisocyanate polyaddition products are, in particular, compounds which strongly accelerate the reaction of the hydroxyl-containing compounds of the component (b) and, if used, (c) with the organic, modified or unmodified polyisocyanates (a). Suitable catalysts are organic metal compounds, preferably organic tin compounds such as tin(II) salts of organic carboxylic acids, eg. tin(II) diacetate, tin(II) dioctoate, tin(II) diethylhexanoate and tin(II) dilaurate, and the dialkyltin(IV) salts of organic carboxylic acids, eg. dibutyltin diacetate, dibutyltin dilaurate, dibutyltin maleate and dioctyltin diacetate. Other compounds which have been found to be well-suited are dialkyltin(IV) mercapto compounds such as bislauryltin(IV) dimercaptide and compounds of the formula $R_2Sn(SR'—O—CO—R'')_2$ or $R_2Sn(SR'—CO—OR'')_2$, where R is an alkyl radical having at least 8 carbon atoms, R' is an alkyl radical having at least 2 carbon atoms and R" is an alkyl radical having at least 4 carbon atoms. Examples of catalyst of this type, which are described, for example, in DD-A-218 668, are: dioctyltin bis(thioethylene glycol-2-ethylhexanoate), dioctyltin bis(thioethylene glycol laurate), dioctyltin bis(2-ethylhexyl thiolatoacetate), dioctyltin bis(hexyl thiolatoacetate) and doctyltin bis(lauryl thiolatoacetate). Further catalysts which have been found to be very useful are organotin compounds having tin-oxygen or tin-sulfur compounds, as are described, for example, in DD-A-255 535. These have the formula $(R_3Sn)_2O$, $R_2SnS$, $(R_3Sn)_2S$, $R_2Sn(SR')_2$ or $RSn(SR')_3$, where R and R'0 are alkyl groups containing from 4 to 8 carbon atoms in the case of R and from 4 to 12 carbon atoms in the case of R' and R' can also be a radical —R"COOR'" or —R"OCOR'", where R" is an alkyl group having from 1 to 6 carbon atoms and R'" is an alkylene group having from 4 to 12 carbon atoms. Examples of such compounds are: bis(tributyltin) oxide, dibutyltin sulfide, dioctyltin sulfide, bis(tributyltin) sulfide, dibutyltin bis(2-ethylhexyl thioglycolate), dioctyltin bis(2-ethylhexyl thioglycolate), octyltin tris(2-ethylhexyl thioglycolate), dioctyltin bis(thioethylene glycol 2-ethylhexanoate) and dibutyltin bis(thioethylene glycol laurate).

The organic metal compounds can be used as catalysts either individually or in the form of catalyst combinations. A combination which has been found to be extremely advantageous is that of di-n-octyltin bis(2-ethylhexyl thioglycolate) and mono-n-octyltin tris(2-ethylhexyl thioglycolate), advantageously in a weight ratio of from 70:30 to 30:70 or 94:6.

The organic metal compounds can also be used in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethyldiaminodicyclohexylmethane, pentamethyldiethylenetriamine, bis(dimethylaminoethyl) ether, bis(dimethylaminopropyl)urea, dimethylpiperazine, 1,2-dimethylimidazol, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine.

The further suitable catalysts, particularly when using an excess of polyisocyanate, are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, alkali metal formates and acetates such as potassium formate and potassium acetate and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the component (b).

(f) As blowing agent (f) for producing the cellular PU or PU-polyurea elastomers and PU or PIR foams, preference is given to using water which reacts with the organic, modified or unmodified polyisocyanates (a) to form carbon dioxide and amino groups which in turn react further with the polyisocyanates (a) to form urea groups and can thereby influence the mechanical properties of the cellular polyisocyanate polyaddition products.

To achieve the industrially customary densities, the water is advantageously used in amounts of from 0.05 to 7% by weight, preferably from 0.1 to 6% by weight and in particular from 2 to 4% by weight, based on the weight of the formative components (a) to (c).

Other blowing agents (f) which can be used in place of water or preferably in combination with water are low-boiling liquids which vaporize under the action of the exothermic polyaddition reaction and advantageously have a boiling point at atmospheric pressure in the range from −40 to 80° C., preferably from 10 to 50° C., or gases.

The liquids of the abovementioned type and gases suitable as blowing agent can be selected, for example, from the group consisting of alkanes such as propane, n- and iso-butane, n- and iso-pentane and preferably industrial pentane mixtures, cycloalkanes and cycloalkenes such as cyclobutane, cyclopentene, cyclohexene and preferably cyclopentane and/or aged cyclohexane, dialkyl ethers such as dimethyl ether, methyl ethyl ether or diethyl ether, tert-butyl methyl ether, cycloalkylene ethers such as furan, ketones such as acetone and methyl ethyl ketone, carboxylic esters such as ethyl acetate, methyl formate and tert-butyl ethylene-acrylate, tertiary alcohols such as tert-butanol, carboxylic acids such as formic acid, acetic acid and propionic acid, fluoroalkanes which are degraded in the troposphere and therefore do not damage the ozone layer, eg. trifluoromethane, difluoromethane, difluoroethane, tetrafluoroethane and heptafluoroethane, and gases such as nitrogen, carbon monoxide and noble gases such as helium, neon and krypton.

Other suitable blowing agents are salts which decompose thermally, eg. ammonium bicarbonate and/or ammonium carbamate, or compounds which form such salts in situ, eg. aqueous ammonia and/or amines and carbon dioxide, and ammonium salts of organic carboxylic acids such as the monoammonium salts of malonic acid or boric acid.

The most advantageous amount of solid blowing agents, low-boiling liquids and gases, each of which can be used individually or in the form of mixtures, eg. as liquid mixtures or gas mixtures or as gas-liquid mixtures, depends on the density which is to be achieved and on the amount of water used. The amounts required can readily be determined by simple experiments. Satisfactory results are usually given by amounts of solid of from 0.5 to 30 parts by weight, preferably from 2 to 15 parts by weight, amounts of liquid of from 1 to 15 parts by weight, preferably from 3 to 12 parts by weight, and/or amounts of gas of from 0.01 to 80 parts by weight, preferably from 10 to 35 parts by weight, in each case based on the weight of the formative components (a), (b) and, if used, (c). The loading with gas, eg. air, carbon dioxide, nitrogen and/or helium, can be carried out either via the relatively high molecular weight compounds (b) and, if used, low molecular weight chain extenders and/or crosslinkers (c), via the polyisocyanates (a) or via (a) and (b) and, if used, (c).

g) The compact or cellular moldings comprising polyisocyanate polyaddition products produced by the process of the present invention can be provided with a covering layer, eg. of paint or varnish or a decorative material, and/or an insert as strengthening element and/or, in particular, a reinforcing material.

Suitable decorative materials are, for example, paper or cardboard, each of which may be printed or colored, films made of TPU, PVC, polyvinyl chloride-containing polymer mixtures, eg. PVC/ABS, PVC/PU, PVC/ABS/polyvinyl acetate, vinyl chloride-methacrylate-butadiene-styrene copolymer or ethylene-vinyl acetate-vinyl chloride graft copolymer and textiles or carpets.

Inserts which have been found to be useful are, for example, ones made of metallic materials such as aluminum, copper, titanium, brass or steel sheet, or plastics such as TPU, polyamide, polycarbonate, polyalkylene terephthalate, eg. polybutylene terephthalate, and polyolefin homopolymers or copolymers and also mixtures and blends of such plastics.

Suitable reinforcing materials are, for example, fibers and lay-ups, woven fabrics, mats, felts or nonwovens produced from fibers. Suitable fibers are, for example, natural fibers such as cellulose fibers, eg. cotton, sisal, jute, hemp, reed or flax fibers, synthetic fibers such as polyester, polyurethane, polyamide, aramid or polyacrylonitrile fibers, metal fibers, preferably carbon fibers and in particular glass fibers, with the fibers being able to be provided with coupling agents and/or sizes. The type of reinforcing material depends on the purpose for which the moldings are to be used.

Suitable glass fibers, which can, as mentioned above, also be used in the form of, for example, woven fabrics, mats, nonwovens and/or preferably fiberglass rovings or chopped fiberglass made of low-alkali E glasses and having a diameter of from 5 to 200 $\mu$m, preferably from 6 to 15 $\mu$m, generally have a mean fiber length of from 0.05 to 1 mm, preferably from 0.1 to 0.5 mm, after incorporation into the PU molding compositions.

To produce moldings having, for example, a density of from 0.15 to 1.4 g/cm$^3$, it is particularly useful to employ combinations of a PU system and glass mats, woven fabrics and/or lay-ups. For moldings having an overall density of up to about 0.6 g/cm$^3$ and a thickness up to about 5 mm, suitable reinforcing materials are, for example, bulky, continuous glass mats, for example having glass weights per unit area of from 225 to 650 g/m$^2$, which are very readily permeable on foaming the PU system, so that complete impregnation of the glass mats can be achieved. The moldings produced by the process of the present invention can have reinforcing material contents, eg. glass contents, of up to 75% by weight, for example when woven glass fabrics or glass lay-ups are used as additional or sole reinforcing material; on the other hand, if only continuous glass mats are used, the glass content is lower because of the high volume of the mats and is up to about 45% by weight.

h) To produce the self-releasing, compact or cellular moldings which comprise polyisocyanate polyaddition products and may contain reinforcing material, it can be advantageous for process or system-specific reasons to use additional auxiliaries. Examples of such possible auxiliaries are additional external and/or internal mold release agents, surface-active substances, foam stabilizers, cell regulators, lubricants, fillers, dyes, pigments, flame retardants, hydrolysis inhibitors, fungistatic and bacteriostatic substances or mixtures thereof and, particularly when producing moldings having a compacted surface zone and a cellular core using water as blowing agent in a closed mold with compaction, microporous activated carbon and/or microporous carbon molecular sieves as described in U.S. Pat. No. 5,254,597, crystalline, microporous molecular sieves and/or crystalline silicon oxide as described in U.S. Pat. No. 5,110,834, amorphous microporous silica gel as described in EP-A-0 513 573, condensates of polyhydroxyl compounds and ammonium carbonate and/or salts of amines and carbon dioxide. Suitable additional mold release agents are, for example, metal salts of stearic acid which can be prepared from commercially available stearic acid and can, without significantly impairing the release action, contain up to 10% by weight, preferably up to 5% by weight, of unsaturated or saturated carboxylic acids having from 8 to 24 carbon atoms, eg. palmitic acid, oleic acid, ricinoleic acid etc.

Metals used for forming the metal salts of stearic acid are, for example, alkali metals, preferably sodium and potassium, alkaline earth metals, preferably magnesium and calcium, and in particular zinc. Metal salts of stearic acid which are preferably used are zinc stearate, calcium stearate and sodium stearate or mixtures of at least two stearates.

Particular preference is given to using a mixture of zinc, calcium and sodium stearates.

If the additional use of the metal salts of stearic acid as mold release agent proves to be advantageous, the metal stearates are advantageously used in an amount of up to 12% by weight, preferably from 0.1 to 8% by weight, based on the weight of the relatively high molecular weight compounds containing at least two reactive hydrogen atoms (b).

Suitable surface-active substances are, for example, compounds which serve to aid the homogenization of the starting materials and may also be suitable for regulating the cell structure. Examples which may be mentioned are emulsifiers such as the sodium salts of castor oil sulfates or of fatty acids and also amine salts of fatty acids, eg. diethylamine oleate, diethanolamine stearate, diethanolamine ricinoleate, salts of sulfonic acids, eg. alkali metal or ammonium salts of dodecylbenzene- or dinaphthylmethane-disulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, turkey red oil and peanut oil and cell regulators such as paraffins, fatty alcohols and dimethylpolysiloxanes. Oligomeric polyacrylates having polyoxyalkylene and fluoroalkane radicals as side groups are also suitable for improving the emulsifying action, the cell structure and/or stabilizing the foam. The surface-active substances are usually employed in amounts of from 0.01 to 5 parts by weight, based on 10 parts by weight of the component (b). As lubricant, the addition of a ricinoleic polyester having a molecular weight of from 1500 to 3500, preferably from 2000 to 3000, has been found to be particularly useful and this is advantageously used in an amount of from 0.5 to 10% by weight, preferably from 5 to 8% by weight, based on the weight of the component (b) or the components (b) and (c).

For the purposes of the present invention, fillers, in particular reinforcing fillers, are the customary organic and inorganic fillers and reinforcing materials known per se. Specific examples are: inorganic fillers such as glass spheres, siliceous minerals, for example sheet silicates such as antigorite, serpentine, hornblends, amphiboles, chrysotile, talc, wollastonite, mica and synthetic silicates such as magnesium aluminum silicate (Transpafill®); metal oxides such as kaolin, aluminum oxides, aluminum silicate, titanium oxides and iron oxides; metal salts such as chalk, barite; and inorganic pigments such as cadmium sulfide and zinc sulfide. Suitable organic fillers are, for example: carbon black, melamine, rosin, cyclopentadienyl resins and graft polymers. The fillers can be used either individually or in appropriate combinations among one another or with one another. It is also possible to use fillers in combination with reinforcing materials.

The inorganic and/or organic fillers can be incorporated into the reaction mixture and, if they are used at all, are advantageously used in an amount of from 0.5 to 50% by weight, preferably from 1 to 40% by weight, based on the weight of the components (a) to (c).

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl)ethylene diphosphate.

Apart from the abovementioned halogen-substituted phosphates, it is also possible to use inorganic flame retardants such as modified or unmodified red phosphorus, expanded graphite, hydrated aluminum oxide, antimony trioxide, arsenic oxide, ammonium polyphosphate and calcium sulfate or cyanuric acid derivatives such as melamine or mixtures of at least two flame retardants such as expanded graphite and ammonium polyphosphate, ammonium polyphosphates and melamine and also, if desired, expanded graphite and/or starch for making the moldings produced according to the present invention flame resistant. In general, it has been found to be advantageous to use from 2 to 50 parts by weight, preferably from 5 to 25 parts by weight, of the flame retardants or mixtures mentioned per 100 parts by weight of the components (a) to (c).

Further details regarding the abovementioned other customary auxiliaries and additives may be found in the specialist literature, for example the monograph by J. H. Saunders and K. C. Frisch, "High Polymers", Volume XVI, Polyurethanes, parts 1 and 2, Interscience Publishers 1962 and 1964, or the Kunststoff-Handbuch, Polyurethane, Volume VII, Carl-Hanser-Verlag, Munich, Vienna, 1st and 2nd editions, 1966 and 1983.

To produce the compact or cellular moldings, the organic, modified or unmodified polyisocyanates (a), relatively high molecular weight compounds containing at least two reactive hydrogen atoms (b) and, if desired, low molecular weight chain extenders and/or crosslinkers can be reacted in such amounts that the equivalence ratio of NCO groups of the polyisocyanates (a) to the sum of the reactive hydrogen atoms of the components (b) and, if used, (c) is 0.85–1.50:1, preferably 0.95–1.15:1 and in particular 1.0–1.1:1.

To produce moldings comprising polyisocyanate polyaddition products containing isocyanurate groups, it is advantageous to use equivalence ratios of NCO groups of the polyisocyanates (a) to the sum of the reactive hydrogen atoms of the component (b) and, if used, (c) of 1.6–30:1, preferably 1.6–15:1 and in particular 2.5–10:1.

The cellular or compact polyisocyanate polyaddition products of the present invention which may contain reinforcing material and preferably contain bonded urethane or urethane and urea groups and possibly isocyanurate groups or predominantly urea groups can be produced by the prepolymer process or preferably by the one-shot process using the low-pressure technique or the high-pressure technique in open or preferably closed, advantageously heatable molds, for example metal molds made of, for example, aluminum, cast iron or steel or molds made of fiber-reinforced polyester or epoxide molding compositions. Cellular and compact moldings comprising polyurethane or polyurethane-polyurea elastomers are produced, in particular, by means of the reaction injection molding technique (RIM technique). These methods are described, for example, by Piechota and Röhr in "Integralschaumstoff", Carl-Hanser-Verlag, Munich, Vienna, 1975; D. J. Prepelka and J. L. Wharton in Journal of Cellular Plastics, March/April 1975, pages 87 to 98, U. Knipp in Journal of Cellular Plastics, March/April 1973, pages 76 to 84 and in the Kunststoff-Handbuch, Volume 7, Polyurethane, 2nd edition, 1983, Pages 333 ff.

It has been found to be particularly advantageous to employ the two-component method and to combine the formative components (b), (d) and, if desired, (c) and also (e) to (f) as the component (A) and to use the organic polyisocyanates, modified polyisocyanates (a) or mixtures of said polyisocyanates and, if desired, blowing agents as component (B).

The formative components can be mixed at from 15 to 80° C., preferably from 20 to 55° C., and introduced into an open or closed mold which for producing reinforced moldings can be lined beforehand with woven fabrics, mats, felts, nonwovens and/or lay-ups as reinforcing material. To produce integral foams and cellular or compact elastomers, the reaction mixture can be introduced under superatmospheric pressure into the closed mold.

Mixing can be carried out mechanically by means of a stirrer or stirring screw or under high pressure in countercurrent injection processes. The mold temperature is advantageously from 20 to 120° C., preferably from 30 to 80° C. and in particular from 45 to 60° C. If the moldings are produced in a closed mold with compaction, eg. to form a compact surface zone and a cellular core of the molding, it has been found to be advantageous to employ degrees of compaction in the range from 1.2 to 8.3, preferably from 1.6 to 6.0 and in particular from 2.0 to 4.0.

The cellular elastomers produced by the process of the present invention have densities of from about 0.76 to 1.1 g/cm$^3$, preferably from 0.9 to 1.0 g/cm$^3$, with the density of products containing fillers and/or, in particular, reinforced with glass mats being able to reach higher values, eg. up to 1.4 g/cm$^3$ and more. Moldings comprising such cellular elastomers are used, for example, in the automobile industry, for example in automobile interiors as lining components, parcel shelves, trunk covers, dashboards and headrests, and as exterior components such as rear spoilers, gutters and bumpers and also as rollers, sliding sunroofs and interior door linings for automobiles. Compact elastomers have densities of from about 1.0 to 1.1 g/cm$^3$, with the products containing fillers and/or reinforcing material being able to have densities up to 2.0 g/cm$^3$ and more. Compact moldings of this type are suitable, for example, in the automobile industry as buckets of seats, spare wheel recesses or engine splash guards.

The flexible, semirigid and rigid molding polyurethane foams produced by the process of the present invention and also the corresponding polyurethane integral foam moldings have a density of from 0.025 to 0.75 g/cm$^3$, with the densities of the molded PU foams being preferably from 0.03 to 0.24 g/cm$^3$ and in particular from 0.03 to 0.1 g/cm$^3$ and the densities of the PU integral foam moldings being preferably from 0.08 to 0.75 g/cm$^3$ and in particular from 0.24 to 0.6 g/cm$^3$. The PU foam moldings and PU integral foam moldings can be used, for example, in the vehicle industry, eg. automobile, aircraft and shipbuilding industries, the furniture and sports article industries as, for example, padding materials, eg. seats for automobiles, motorbikes or tractors, as headrests, lining elements, housing components, consoles, cores and internal protection for skis, roof frames and sunroofs in vehicles and window frames.

The invention is illustrated by the following examples.

EXAMPLE 1

Production of Cellular Polyurethane Molded Sheets Reinforced with Glass Mats

A Component 56.2 parts by weight of a polyoxypropylene polyol having a hydroxyl number of 490 and prepared by propoxylation of an initiator mixture of sucrose and glycerol in a weight ratio of 60:40, 4.5 parts by weight of glycerol, 7 parts by weight of a pentaerythritol-initiated polyoxyethylene polyol having a hydroxyl number of 630, 1.8 parts by weight of water, 0.9 part by weight of a stabilizer based on silicone (Stabilizer OS 340 from Bayer AG, Germany), 1.0 part by weight of 1-methylimidazole, 0.8 part by weight of dimethyliminocyclohexane, 20.0 parts by weight of an monomeric alkyl epoxy stearate (Edenol B35 from Henkel), 6.0 parts by weight of an internal mold release agent prepared by reacting one mol of polyisobutylenesuccinic anhydride having a mean molecular weight $M_n$ (number average) of the polyisobutylene radical of 1000 and one mol of an ester of oleic acid/adipic acid/pentaerythritol having an OH number of 20 and an acid number of 23 mg KOH/g. The reaction was carried out at 110° C. for 4 hours while flushing with nitrogen. the solvent used was Edenol B33. After cooling, a low-viscosity liquid of the monoester in Edenol B35 (weight ratio 1:1) having an acid number of 13.7 mg KOH/g was obtained. The mold release agent displayed a pronounced ester band at 1737 cm$^{-1}$ in the IR spectrum, 1.8 parts by weight of black paste from ISL, Germany.

B Component

Mixture of diphenylmethane diisocyanates and polyphenyl-polymethylene polyisocyanates having an NCO content of 31% by weight (raw MDI). The mixing ratio was 100:131.1.

When free-foamed at 25° C., the polyaddition mixture displayed the following parameters Cream time: 26 seconds Rise time: 70 seconds The free-foamed foam density was 79.5 g/l.

The molded sheets reinforced with glass mats were produced on a high-pressure metering unit model ®Puromat 30, from Elastogran-Maschinenbau, Straßlach bei München, by the RIM technique in a metal mold heated to 56° C. and having the internal dimensions 4×60×300 mm, which was treated once at the beginning of the series of experiments with the external mold release agent LS 1000 from Klüber Chemie AG, Germany. Commercial glass mats having a weight per unit area of from 450 to 600 g/m$^2$. were laid into the mold.

100 parts by weight of the A component and 130 parts by weight of the B component, each of which were at 25° C., were mixed by the RIM method in the abovementioned high-pressure metering unit and injected into the closed mold containing glass mats.

The pressure of the A component was 170 bar and that of the B component was 200 bar. The shot time was 2 seconds.

The molded sheet was removed from the mold after 120 seconds. It had a density of 0.9 g/cm$^3$ and when using a glass mat of 600 g/m$^2$ had a glass content of 20% by weight.

After 65 molded sheets had been able to be removed from the mold without problems, the series of experiments was terminated.

The glass fiber-reinforced polyurethane sheets were subsequently backfoamed with a conventional semirigid foam in order to test adhesion. Even after 78 hours, the foam still adhered.

EXAMPLE 2

Production of Rigid Polyurethane Integral Foam Moldings

A Component 45.0 parts by weight of a trimethylolpropane-initiated polyoxypropylene polyol having an OH number of 860, 10 parts by weight of a polyoxypropylene polyol having a hydroxyl number of 400 and a functionality of 4.3 and prepared using an initiator mixture of sucrose, glycerol and water, 24 parts by weight of a 1,2-propanediol-initiated polyoxypropylene polyol having a functionality of 2 and an OH number of 56, 1.1 parts by weight of additive SM from Bayer AG, Germany, 1.0 part by weight of silicone DG 193 from DOW Corning, 0.2 part by weight of phosphoric acid, 1.1 parts by weight of N,N-bis(dimethylaminopropyl) methylamine, 10.3 part by weight of 1-methylimidazole, 10.0 parts by weight of a glycerol-initiated polyoxypropylene polyol having a hydroxyl number of 400, 6.0 parts by weight of the mold release agent from Example 1.

B Component

Mixture of diphenylmethane diisocyanates and polyphenylpolymethylene polyisocyanates having an NCO content of 31% by weight (raw MDI). The mixing ratio was 100:148.31.

When free-foamed at 200° C., the polyaddition mixture displayed the following parameters:

Cream time: 42 seconds

Fiber time: 72 seconds

Rise time: 80 seconds

Foam density (free-foamed): 184 g/l

The machine times were

Cream time: 13 seconds

Fiber time: 35 seconds

Rise time: 42 seconds

Foam density (machine): 175 g/l

The rigid polyurethane integral foam materials were produced on a high-pressure metering unit model ®Puromat 30 from Elastogran-Maschinenbau, Straßlach bei München, by the RIM technique in an aluminum mold for a spoiler which had been heated to 50° C. The pressure of the A and B components was 150 bar. The air loading was 20%. The demolding time was 3 minutes. Before the commencement of the experiment, the mold was treated with a customary wax-containing mold release agent Acmosil 35-3053 H from Acmos. Subsequently, 50 spoilers were produced without additional mold release agent.

EXAMPLE 3

A Component 36.2 parts by weight of a polyol which had been prepared as described in EP 0 554 590 by ring-opening of epoxidized soybean oil with glycol and had an OH number of 253

28.8 parts by weight of castor oil having an OH number of 160, 26.8 parts by weight of a glycerol-initiated polyoxypropylene polyol having an OH number of 555 and prepared using boron trifluoride etherate as catalyst, 1.0 part by weight of water, 0.2 part by weight of Dabco 8154 from Air Products, 1.0 part by weight of an emulsifier as described in Example 12 of U.S. Pat. No. 5,106,875, 6 parts by weight of an internal mold release agent prepared by esterification of 1 mol of polyisobutylenesuccinic anhydride having a mean molecular weight $M_n$ of the polyisobutylene radical of 1000 with 2 moles of a trimethylolpropane-initiated polyoxypropylene(86% by weight)-polyoxyethylene-(14% by weight) triol having a hydroxyl number of 26, which had been mixed in a ratio of 1:1 with a polyoxypropylene polyol which had been initiated using 1,2-propanediol and had an OH number of 105.

The moldings were produced on a high-pressure metering unit model ®Puromat 30 by the RIM technique in an aluminum mold heated to 60° C. and having the internal dimensions 4×250×300 mm.

100 parts by weight of the A component and 140.6 parts by weight of the B component, which were each at 30° C., were mixed by the RIM technique in the high-pressure metering unit described in Example 1 and injected into the closed mold.

The pressure of the A and B components was from 150 to 200 bar, at an air loading of the A component of 40% by volume. The shot time was 2 seconds.

The molded sheet was removed from the mold after 90 seconds and had a density of 1.15 g/cm³.

After production of 20 molded sheets which were able to be removed from the mold without problems, the series of experiments was terminated.

EXAMPLE 4

This example was carried out using a method similar to Example 3. The mold release agent used was 6 parts by weight of the copolymer described in WO/07944, Example 1.1, page 9. After 50 removals, the series of experiments was terminated.

EXAMPLE 5

This example was carried out using a method similar to Example 1. The internal mold release agent was prepared by reacting one mole of polyisobutylenesuccinic anhydride (PIBSA) having a mean molecular weight $M_n$ (number average) of the polyisobutylene radical of 1000 and 1 mol of an ester of sorbitan monooleate. The two starting materials were stirred in a round-bottomed flask for 3 hours at an internal temperature of 130–1400° C. under a nitrogen atmosphere. The final product had an OH number of 17 mg KOH/g and an acid number of 32 mg KOH/g. An amount of 5 parts by weight, based on the polyol component, was used.

After producing 85 glass fiber-reinforced sheets having a length of 120 cm, the series of experiments was terminated. After backfoaming of the sheets with a semirigid foam, the adhesion was still excellent after 120 hours.

EXAMPLE 6

A Component:

58.6 parts by weight of a polyoxypropylene polyol having a hydroxyl number of 490, and prepared by propoxylation of an initiator mixture of sucrose and glycerol in a weight ratio of 60:40

20.0 parts by weight of a hydroxyl-containing alkylene oxide stearate for improving the flow (®Edenor B33 from Henkel, Germany)

4.5 parts by weight of glycerol 3.8 parts by weight of black paste from ISL, Cologne 4.0 parts by weight of a pentaerythritol-initiated polyoxyethylene polyol having a hydroxyl number of 630

0.8 part by weight of dimethylaminocyclohexane 1.4 parts by weight of water 0.9 part of a stabilizer based on silicone (stabilizer OS 340 from BAYER AG, Germany)

1.0 part by weight of 1-methylimidazole 5.0 parts by weight of an internal mold release agent prepared by esterifying 0.1 mol of polyisobutylenesuccinic anhydride having a mean molecular weight $M_n$ of the polyisobutylene radical of 1000 with 0.1 mol of "Kraton Liquid® L-1203 Polymer" from Shell Chemicals having a hydroxyl number of 15 mg KOH/g. The reaction product had an acid number of 10.0 mg of KOH/g. It was prepared in a three-neck flask at 145° C., over a period of 4 hours.

The moldings were produced on a high-pressure metering unit model ®Puromat 30 by the RIM technique in an aluminum mold heated to 60° C. and having the internal dimensions 4×250×300 mm.

100 parts by weight of the A component and 140.6 parts by weight of the B component, each of which were at 30° C., were mixed by the RIM technique in the high-pressure metering unit described in Example 1 and injected into the closed mold.

The pressure of the A and B components was from 150 to 200 bar at an air loading of the A component of 40% by volume. The shot time was 2 seconds.

The molded sheet was removed from the mold after 90 seconds. It had a density of 1.15 g/cm³.

After producing 20 molded sheets which had been able to be removed from the mold without problems, the series of experiments was terminated.

B Component: As in Example 1

EXAMPLE 7

A Component:

58.6 parts by weight of a polyoxypropylene polyol having a hydroxyl number of 490 and prepared by propoxylation of an initiator mixture of sucrose and glycerol in a weight ratio of 60:40

20.0 parts by weight of a hydroxyl-containing alkylene oxide stearate for improving the flow (®Edenor B33 from Henkel, Germany)

4.5 parts by weight of glycerol 3.8 parts by weight of black paste from ISL, Cologne 4.0 parts by weight of a pentaerythritol-initiated polyoxyethylene polyol having a hydroxyl number of 630

0.8 part by weight of dimethylaminocyclohexane 1.4 parts by weight of water 0.9 part by weight of a stabilizer based on silicone (stabilizer OS 340 from BAYER AG, Germany)

1.0 part by weight of 1-methylimidazole 5.0 parts by weight of an internal mold release agent prepared by esterification of 0.05 mol of MSA-polyisobutylene copolymer having a mean molecular weight $M_n$ of the polyisobutylene radical of 1000 with 0.1 mol of "Kraton Liquid® L-1203 Polymer" from Shell Chemicals having a hydroxyl number of 15 mg KOH/g. The reaction product had an acid number of 17.1 mg KOH/g. It was prepared in a three-neck flask at 145° C., over a period of 4 hours.

The moldings were produced on a high-pressure metering unit model ®Puromat 30 by the RIM technique in an aluminum mold heated to 60° C. and having the internal dimensions 4×250×300 mm.

100 parts by weight of the A component and 140.6 parts by weight of the B component, each of which was at 30° C., were mixed by the RIM technique in the high-pressure metering unit described in Example 1 and injected into the closed mold.

The pressure of the A and B components was from 150 to 200 bar, at an air loading of the A component of 40% by volume. The shot time was 2 seconds.

The molded sheet was removed from the mold after 90 seconds. It had a density of 1.15 g/cm³.

After producing 20 molded sheets which had been able to be removed from the mold without problems, the series of experiments was terminated.

B Component: As in Example 1

EXAMPLE 8

A Component:

58.6 parts by weight of a polyoxypropylene polyol having a hydroxyl number of 490 and prepared by propoxylation of an initiator mixture of sucrose and glycerol in a weight ratio of 60:40

20.0 parts by weight of a hydroxyl-containing alkylene oxide stearate for improving the flow (®Edenor B33 from Henkel, Germany)

4.5 parts by weight of glycerol 3.8 parts by weight of black paste from ISL, Cologne 4.0 parts by weight of a pentaerythritol-initiated polyoxyethylene polyol having a hydroxyl number of 630

0.8 part by weight of dimethylaminocyclohexane 1.4 parts by weight of water 0.9 part by weight of a stabilizer based on silicone (stabilizer OS 340 from BAYER AG, Germany)

1.0 part by weight of 1-methylimidazole 5.0 parts by weight of an internal mold release agent prepared by esterification of 0.2 mol of polyisobutylenesuccinic anhydride with 0.1 mol of "Kraton Liquid® L 2203 Polymer" from Shell Chemicals having a hydroxy equivalent weight of 1800. It was prepared in a three-neck flask at 145° C., over a period of 4 hours.

The moldings were produced on a high-pressure metering unit model ®Puromat 30 by the RIM technique in an aluminum mold heated to 60° C. and having the internal dimensions 4×250×300 mm.

100 parts by weight of A component and 140.6 parts by weight of the B component, each of which were at 30° C., were mixed by the RIM technique in the high-pressure metering unit described in Example 1 and injected into the closed mold.

The pressure of the A and B components was from 150 to 200 bar, at an air loading of the A component of 40% by volume. The shot time was 2 seconds.

The molded sheet was removed from the mold after 90 seconds. It had a density of 1.15 g/cm³.

After producing 20 molded sheets which had been able to be removed from the mold without problems, the series of experiments was terminated.

B Component: as in Example 1

EXAMPLE 9

A Component:

58.6 parts by weight of a polyoxypropylene polyol having a hydroxyl number of 490 and prepared by propoxylation of an initiator mixture of sucrose and glycerol in a weight ratio of 60:40

20.0 parts by weight of a hydroxyl-containing alkylene oxide stearate for improving the flow (®Edenor B33 from Henkel, Germany)

4.5 parts by weight of glycerol 3.8 parts by weight of black paste from ISL, Cologne 4.0 parts by weight of a pentaerythritol-initiated polyoxyethylene polyol having a hydroxyl number of 630

0.8 part by weight of dimethylaminocyclohexane 1.4 parts by weight of water 0.9 part by weight of a stabilizer based on silicone (stabilizer OS 340 from BAYER AG, Germany)

1.0 part by weight of 1-methylimidazole 5.0 parts by weight of an internal mold release agent prepared by esterification of 0.1 mol of polyisobutylenesuccinic succinic anhydride with 0.1 mol of "Kraton Liquid® Polymer"EKP 207 from Shell Chemicals having a hydroxy equivalent weight of 6000. It was prepared in a three-neck flask at 145° C., over a period of 4 hours.

The moldings were produced on a high-pressure metering unit model ®Puromat 30 by the RIM technique in an aluminum mold heated to 60° C. and having the internal dimensions 4×250×300 mm.

100 parts by weight of the A component and 140.6 parts by weight of the B component, each of which were at 30° C., were mixed by the RIM technique in the high-pressure metering unit described in Example 1 and injected into the closed mold.

The pressure of the A and B components was from 150 to 200 bar, at an air loading of the A component of 40% by volume. The shot time was 2 seconds.

The molded sheet was removed from the mold after 90 seconds. It had a density of 1.15 g/cm³.

After producing 20 molded sheets which had been able to be removed from the mold without problems, the series of experiments was terminated.

B Component: As in Example 1

We claim:

1. A process for producing self-releasing, compact or cellular moldings comprising reacting
    a) organic and/or modified organic polyisocyanates with
    b) at least one compound containing at least two reactive hydrogen atoms and having a molecular weight of from 62 to 10,000 and, optionally,
    c) chain extenders and/or crosslinkers in the presence of
    d) internal mold release agents and in the presence or absence of
    e) catalysts,
    f) blowing agents,
    g) reinforcing materials and
    h) auxiliaries
in an open or closed mold, wherein the internal mold release agents (d) comprise diesters and/or monoesters of alkylsuccinic acids and/or diesters and/or monoesters of alkenylsuccinic acids.

2. A process as claimed in claim 1, wherein the alkyl or alkenyl groups of the alkylsuccinic or alkenylsuccinic diesters or monoesters have a mean molecular weight (number average) $M_n$ of from 250 to 3000.

3. A process as claimed in claim 2, wherein the alkyl groups of the alkylsuccinic or alkenylsuccinic acids or monesters/diesters are linear or branched and comprise polyisopropylene or polyisobutylene radicals and the alkenyl groups comprise polyethenyl, polyisopropenyl or polyisobutenyl radicals.

4. A process as claimed in claim 3, wherein the alkyl groups comprise oligomers of propene and/or at least one branched 1-olefin having from 4 to 10 carbon atoms and contain at least 3 olefin units and have a mean molecular weight ($M_w$) of from 300 to 3000 g/mol.

5. A process as claimed in claim 1, wherein the alkylsuccinic and/or alkenylsuccinic acids is prepared by polymerization of
    a) from 20 to 60 mol % of maleic acid or its anhydride,
    b) from 10 to 70 mol % of at least one oligomer of propene or a branched 1-olefin having from 4 to 10 carbon atoms, having a mean molecular weight M of from 300 to 5000, and
    c) from 1 to 50 mol % of at least one monoethylenically unsaturated compound which can be copolymerized with the monomers a) and b).

6. A process as claimed in claim 5, wherein the monomer c) is selected from the group consisting of
    monoethylenically unsaturated $C_3$–$C_{10}$-monocarboxylic acids;
    linear 1-olefins having from 2 to 40 carbon atoms; and
    vinyl and alkyl allyl ethers having from 1 to 40 carbon atoms in the alkyl radical.

7. A process as claimed in claim 1, wherein the alkylsuccinic or alkenylsuccinic diesters or monoesters are prepared by reacting alkylsuccinic acid or derivatives or alkenylsuccinic acid or derivatives with primary and/or secondary organic monoalcohols and/or polyalcohols.

8. A process as claimed in any of claim 1, wherein the alkylsuccinic or alkenylsuccinic diesters or monoesters are prepared by reacting alkylsuccinic or alkenylsuccinic anhydride with aliphatic monools and/or polyols.

9. A process as claimed in any of claim 1, wherein the alkylsuccinic or alkenylsuccinic diesters and/or monoesters are prepared by reacting alkylsuccinic and/or alkenylsuccinic acid and/or derivatives with monools or polyols selected from the group (A) consisting of
    a) alkanols having up to 40 carbon atoms;
    b) polyether polyols;
    c) polyester polyols;
    d) hydroxyl-containing natural materials;
    e) esters of at least trifunctional alcohols and fatty acids, in which esters at least one hydroxyl group is free; and
    f) aminoalcohols and/or polyols containing only tertiary amino groups.

10. A process as claimed in any of claim 1, wherein the alkylsuccinic diesters or monoesters, alkenylsuccinic diesters or monoesters or mixtures of at least two of the diesters or monoesters or mixtures of diesters and monoesters are used in an amount of from 0.2 to 15 parts by weight per 100 parts by weight of the component (b).

11. A process as claimed in any of claim 1, wherein the chain extenders or crosslinkers have a molecular weight of less than 500.

12. A process as claimed in claim 1, wherein the internal mold release agents comprise the reaction products of polyisobutylenesuccinic anhydride and/or polyisobutylenesuccinic anhydride and/or copolymers with an alcohol (A).

13. A process as claimed in claim 1, wherein the internal mold release agents comprise the reaction products of polyisobutylenesuccinic anhydride and/or copolymers with a combination of an alcohol (A) and an amine (B).

14. A process as claimed in claim 1, wherein the alkylsuccinic and/or alkenylsuccinic diesters and/or monoesters are treated with boron oxide, hydrated boron oxide, boric acid, boric esters, sulfur, phosphorus oxides, epoxides, episulfides, amines and/or alkaline earth metal salts.

15. A process as claimed in claim 1, wherein the reinforcing materials g) comprise fibers or lay-ups, woven fabrics, mats, felts or nonwovens based on glass, carbon, metal, polymer and/or natural fibers.

* * * * *